(12) United States Patent
Miura (10) Patent No.: US 10,382,636 B2
(45) Date of Patent: Aug. 13, 2019

(54) IMAGE READING APPARATUS

(71) Applicant: Brother Kogyo Kabushiki Kaisha, Nagoya (JP)

(72) Inventor: Katsuro Miura, Toyota (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 0 days.

(21) Appl. No.: 15/937,971

(22) Filed: Mar. 28, 2018

(65) Prior Publication Data
US 2018/0288254 A1    Oct. 4, 2018

(30) Foreign Application Priority Data

Mar. 30, 2017 (JP) ................................. 2017-068030

(51) Int. Cl.
| | | |
|---|---|---|
| *H04N 1/00* | (2006.01) | |
| *E05D 11/10* | (2006.01) | |
| *H04N 1/193* | (2006.01) | |
| *E05F 5/00* | (2017.01) | |

(52) U.S. Cl.
CPC ..... *H04N 1/00554* (2013.01); *E05D 11/1014* (2013.01); *E05F 5/00* (2013.01); *H04N 1/0053* (2013.01); *H04N 1/193* (2013.01); *E05Y 2201/21* (2013.01); *E05Y 2201/214* (2013.01); *E05Y 2201/224* (2013.01); *E05Y 2201/244* (2013.01); *E05Y 2201/266* (2013.01); *E05Y 2201/626* (2013.01); *E05Y 2201/654* (2013.01); *E05Y 2201/72* (2013.01); *E05Y 2900/606* (2013.01); *E05Y 2900/608* (2013.01)

(58) Field of Classification Search
CPC ............. H04N 1/00519; H04N 1/0053; H04N 1/00554; H04N 1/193; E05F 5/00; E05D 11/1014; E05Y 2900/608; E05Y 2201/266; E05Y 2201/654; E05Y 2201/224; E05Y 2900/606; E05Y 2201/626; E05Y 2201/72; E05Y 2201/214; E05Y 2201/21
See application file for complete search history.

(56) References Cited

U.S. PATENT DOCUMENTS

| | | | | |
|---|---|---|---|---|
| 7,751,751 | B2 * | 7/2010 | Ohta | G03G 21/1628 399/125 |
| 9,019,578 | B2 * | 4/2015 | Shingai | H04N 1/121 358/498 |
| 9,055,184 | B2 * | 6/2015 | Shingai | H04N 1/00822 |
| 9,268,294 | B2 * | 2/2016 | Namba | H04N 1/00 |
| 2010/0102500 | A1 | 4/2010 | Ito | |

FOREIGN PATENT DOCUMENTS

| | | |
|---|---|---|
| JP | 2010-028262 A | 2/2010 |
| JP | 4656226 B2 | 3/2011 |

* cited by examiner

*Primary Examiner* — Kent Yip
(74) *Attorney, Agent, or Firm* — Burr & Brown, PLLC (57) ABSTRACT

An image reading apparatus includes a reading unit, a hinge connected to the reading unit, and a cover connected to the hinge. The image reading apparatus further includes a decelerator configured to apply a damping resistance to a particular gear of the hinge, as a planet gear engages with the particular gear during movement of the cover from an open position to a closed position.

14 Claims, 9 Drawing Sheets

IMAGE READING APPARATUS

CROSS-REFERENCE TO RELATED APPLICATION

This application claims priority from Japanese Patent Application No. 2017-68030 filed on Mar. 30, 2017, the content of which is incorporated herein by reference in its entirety.

FIELD OF DISCLOSURE

The disclosure relates to an image reading apparatus.

BACKGROUND

US2010-102500A1 discloses an example of an image reading apparatus. The image reading apparatus includes a document table and a document cover. The document table includes a first window, and image sensor elements configured to read an image on a document placed on the first window. The document cover is pivotally coupled to the document table, via a hinge mechanism. The document cover is configured to pivot between a closed position in which the first window is covered, and an open position in which the first window is revealed.

The hinge mechanism disclosed in US2010-102500A1 is a free stop hinge that enables the document cover to be held open and be maintained at any upwardly pivoted position (i.e., at any angle relative to the document table). The free stop hinge includes a base portion and a pivot portion. The base portion is supported by the document table. The pivot portion is fixed to the document cover. The pivot portion allows the document cover to be pivotable relative to the base portion. The base portion accommodates a compression coil spring therein. The compression coil spring exerts biasing force between the base portion and the pivot portion, thereby holding the document cover at the open position so as to not close due to its own weight. This configuration helps a user of the image reading apparatus to readily place a document on the first window of the document table or remove the document from the first window while the cover is held at the open position.

SUMMARY

The document cover of the image reading apparatus disclosed in US2010-102500A1 may be left open for a long period of time. This may cause plastic casing of the document cover to deform due to its weight. Such deformation may cause the document cover to function improperly.

One or more aspects of the disclosure provide an the image reading apparatus that may eliminate or reduce likelihood that a document cover (hereinafter simply referred to as "the cover") is left in an open position for a long period of time, thereby achieving proper functioning of the cover.

According to one or more aspects of the disclosure, an image reading apparatus includes a reading unit, a hinge, and a cover. The reading unit includes a support surface and a reading sensor. The hinge has a pivot axis and is connected to the reading unit. The cover is connected to the hinge. The cover is configured to pivot about the pivot axis between a closed position in which the cover covers the support surface, and an open position in which the cover reveals the support surface. The hinge includes a base member, a pivot member, a first gear, a second gear, a support portion, a planet gear, and a decelerator. The base member is supported by the reading unit. The pivot member is supported by the base member pivotally about the pivot axis. The pivot member is coupled to the cover. The first gear is configured to pivot about a first axis in a first direction based on pivoting of the cover from the closed position toward the open position and configured to pivot about the first axis in a second direction opposite to the first direction based on pivoting of the cover from the open position toward the closed position. The support portion supports the second gear to allow the second gear to pivot about a second axis parallel to the first axis. The planet gear is rotatably supported by the arm and is engaged with the first gear. The planet gear is configured to pivot in the first direction to a disengaged position in which the planet gear is disengaged from the second gear and to pivot in the second direction to an engaged position in which the planet gear is engaged with the second gear. The decelerator is configured to apply a damping resistance to the second gear, as the planet gear engages with the second gear during movement of the cover from the open position to the closed position.

DETAILED DESCRIPTION

Referring to the accompanying drawings, an illustrative embodiment of the disclosure will now be described.

Figure 1:
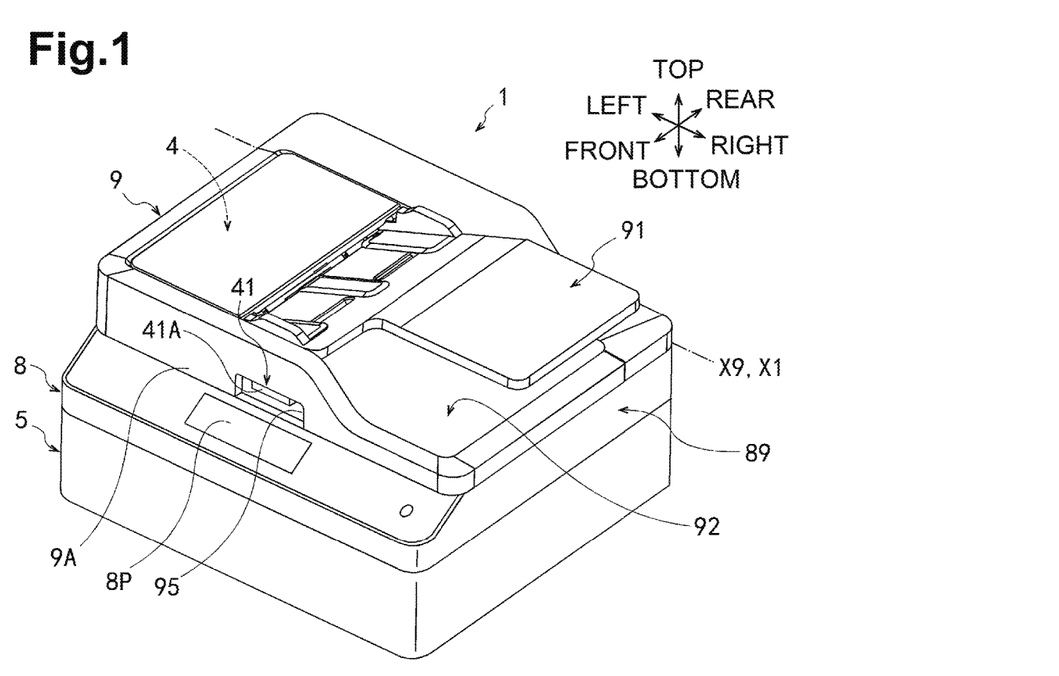
FIG. 1 is a perspective view of an image reading apparatus in an illustrative embodiment according to one or more aspects of the disclosure.

FIG. 1 illustrates an image reading apparatus 1 in an illustrative embodiment according to one or more aspects of the disclosure. As illustrated in FIG. 1, a top-bottom direction may be defined with reference to an orientation of the image reading apparatus 1 that may be disposed in an orientation in which it may be intended to be used. A side of the image reading apparatus 1 in which an operation panel 8P is provided may be defined as the front of the image reading apparatus 1. A front-rear direction may be defined with reference to the front of the image reading apparatus 1. A right-left direction may be defined with respect to the image reading apparatus 1 as viewed from its front. The directions defined in FIG. 1 may be applicable to all the drawings. Because the disclosed components can be positioned in a number of different orientations, the directional terminology is used for purposes of illustration and is in no way limiting.

Hereinafter, various parts of the image reading apparatus 1 will be described with reference to appropriate drawings.

Figure 2:
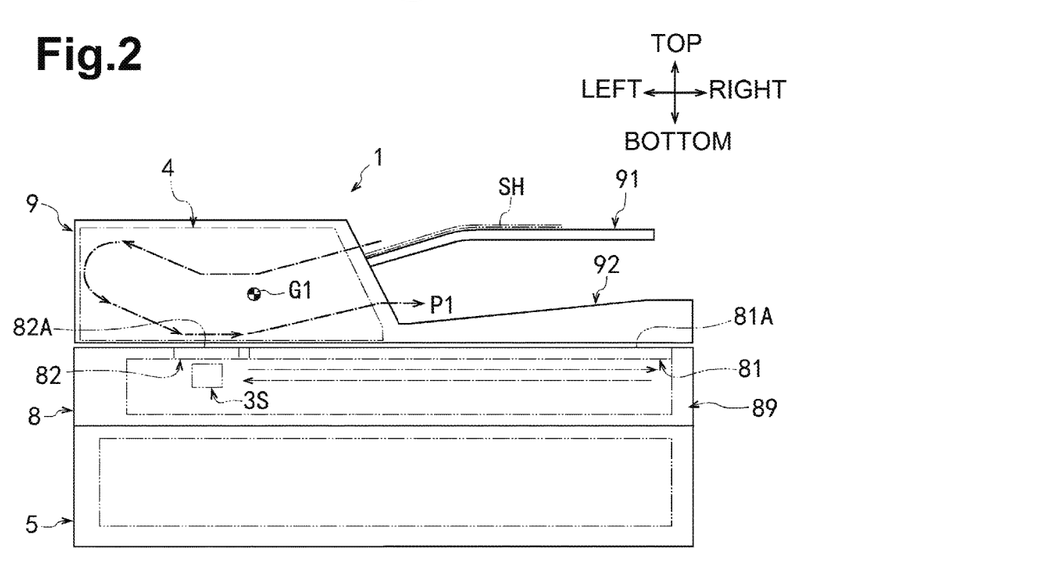
FIG. 2 is a schematic front view of the image reading apparatus in the illustrative embodiment.
Figure 3:
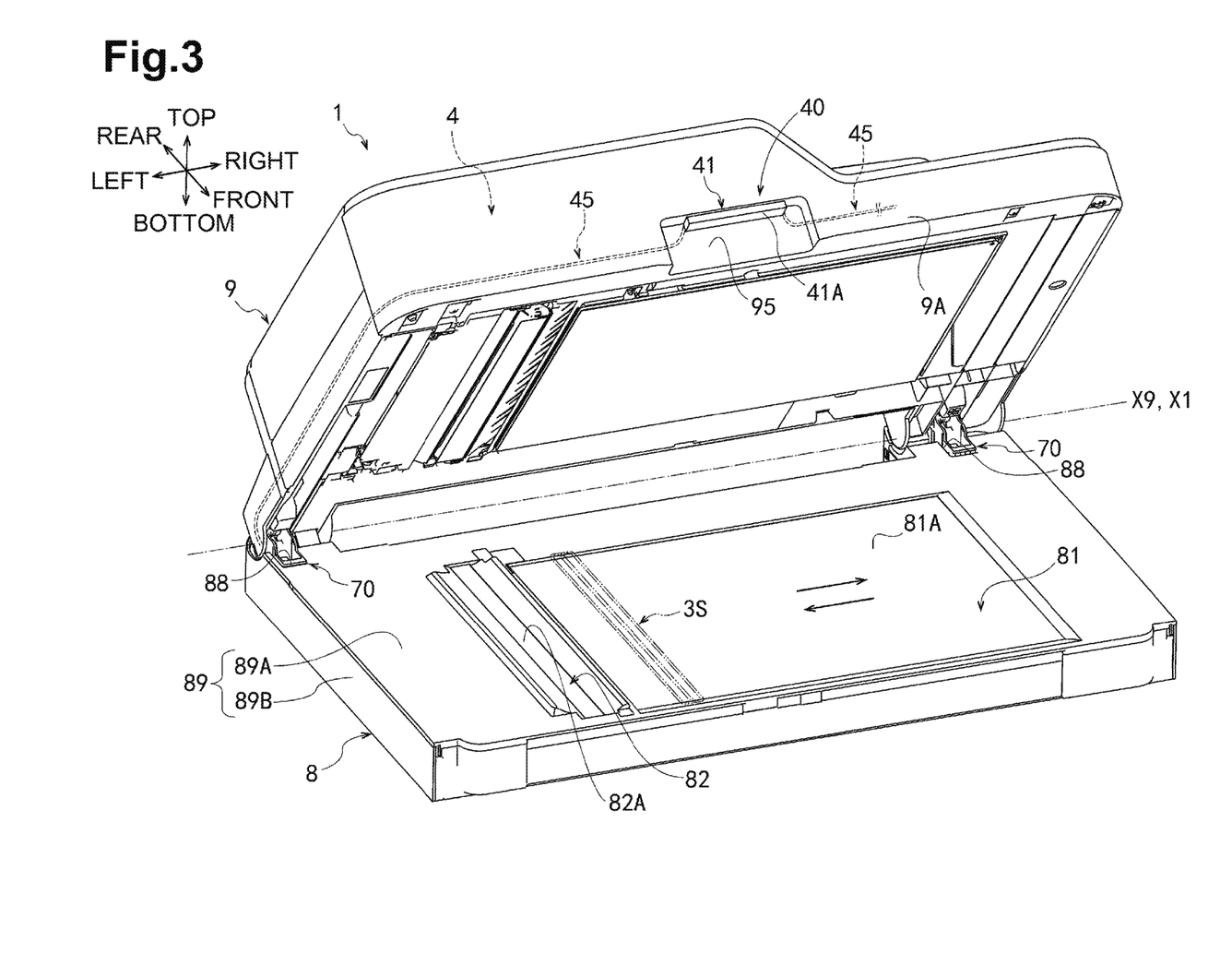
FIG. 3 is a perspective view of a cover of the image reading apparatus in the illustrative embodiment when the cover is at an open position.

As depicted in FIGS. 1 through 3, the image reading apparatus 1 includes a reading unit 8, an image forming unit 5, and a cover 9. As depicted in FIG. 3, the image reading apparatus 1 further includes, for example, two hinges 70. In another embodiment, the image reading apparatus 1 may include more than or less than two hinges 70. Each hinge may have a common or similar shape and configuration.

As depicted in FIGS. 1 and 2, the image forming unit 5 is disposed below the reading unit 8. The image forming unit 5 is configured to form an image on a sheet by an inkjet printing method or an electrophotographic method.

The cover 9 is disposed above the reading unit 8. The cover 9 includes a feed tray 91, a conveying unit 4, and a discharge tray 92.

The feed tray 91 is disposed at a right portion of the cover 9. As depicted in FIG. 2, the feed tray 91 is configured to receive, on an upper surface thereof, one or more sheets SH to be read.

The conveying unit 4 is disposed at a left portion of the cover 9. The conveying unit 4 has a known configuration including a drive motor, a feed roller, a separation roller, and a discharge roller, which are not shown in the drawings. The conveying unit 4 is configured to convey the sheets SH on the feed tray 91, one by one, along a conveying path P1 and discharge the sheets SH onto the discharge tray 92.

As depicted in FIGS. 1 and 2, the discharge tray 92 is disposed below the feed tray 91. As depicted in FIG. 2, the discharge tray 92 is configured receive the sheets SH conveyed along the conveying path P1 by the conveying unit 4.

As depicted in FIG. 2, the conveying unit 4 is located at the left portion of the cover 9, so that a center of gravity G1 of the cover 9 is located closer to a left end of the cover 9 than to a right end of the cover 9.

As depicted in FIGS. 1 and 3, the cover 9 includes a handle recess 95 at its front end portion 9A. The handle recess 95 extends in the right-left direction. The handle recess 95 is recessed into a lower central portion of the front end portion 9A of the cover 9. A user of the image reading apparatus 1 may hold the handle recess 95 to lift up or push down the front end portion 9A of the cover 9.

As depicted in FIGS. 2 and 3, the reading unit 8 includes a housing 89, a first platen glass 81, a second platen glass 82, and a sensor array 3S.

The housing 89 is flat and substantially box-shaped and is formed from thermoplastic resin by injection molding. The housing 89 includes a base 89B and an upper cover 89A. The base 89B is open upward. The base 89B includes rectangular bottom wall and side walls standing from peripheral edges of the bottom wall. The upper cover 89A is disposed so as to cover an upper portion of the base 89B. The first platen glass 81 and the second platen glass 82, each having a generally rectangular shape, are disposed at the upper cover 89A. The second platen glass 82 is disposed to the left of the first platen glass 81 and is elongated in the front-rear direction.

The first platen glass 81 has a support surface 81A, which is a substantially rectangular upper surface. The image sensor 3S reads an image of a sheet SH placed on the support surface 81A. A non-limiting example of the sheet may be a paper sheet, an OHP film, and a book.

The second platen glass 82 has a reading surface 82A, which is a generally rectangular upper surface. The reading sensor 3S reads an image on a sheet SH guided on the reading surface 82A while the conveying unit 4 conveys the sheet SH.

The reading sensor 3S is held by a scanning mechanism (not depicted) in the reading unit 8. The scanning mechanism is configured to reciprocate the reading sensor 3S in the right-left direction under the first platen glass 81 and the second platen glass 82. Non-limiting examples of the image reading sensor are a contact image sensor ("CIS"), and a charge coupled device ("CCD").

When reading an image of a sheet SH placed on the support surface 81A, the image sensor 3S moves under the first platen glass 81. When reading an image of a sheet SH conveyed by the conveying unit 4, the image sensor stays at a predetermined stationary reading position under the second platen glass 82.

As depicted in FIG. 1, the reading unit 8 includes, at its front face, an operation panel 8P. User's operations of the operation panel 8P may be various inputs for actuating the image forming unit 5, the reading sensor 3S, and the conveying unit 4. The operation panel 8P may output various signals according to the inputs.

<Configuration of Hinges>

Figure 4:
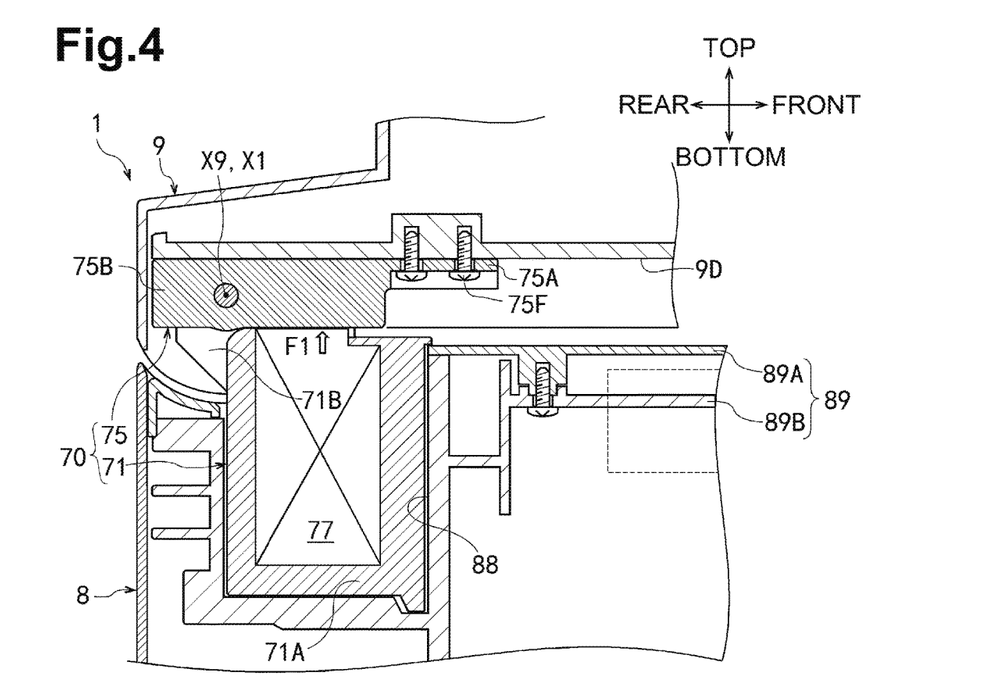
FIG. 4 is a cross-sectional view of the cover and a hinge of the image reading apparatus in the illustrative embodiment.
Figure 5:
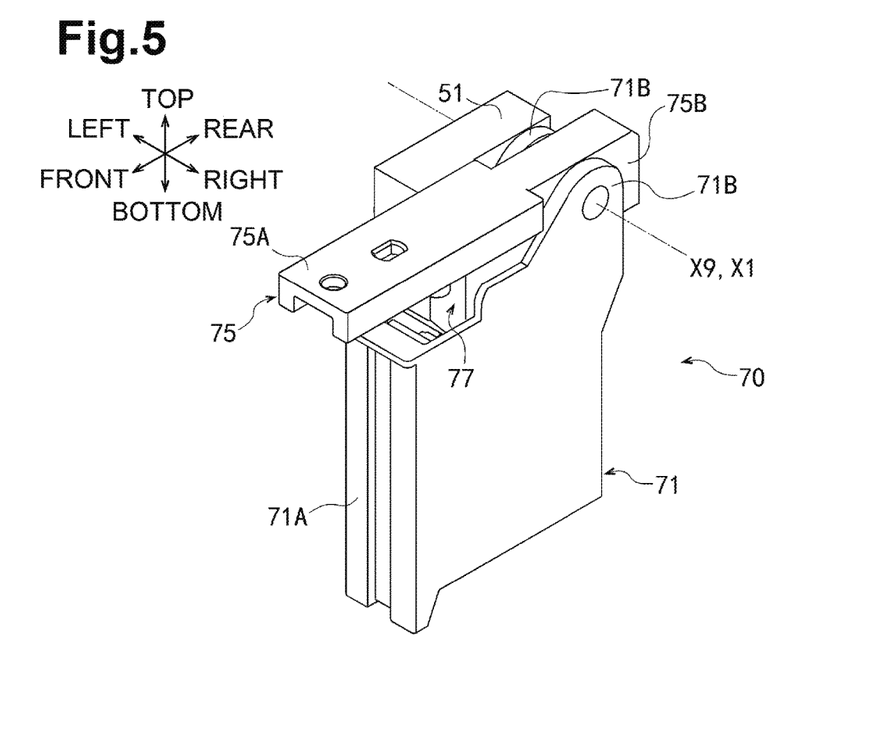
FIG. 5 is a perspective view of the hinge.

As depicted in FIGS. 3 and 4, each of the hinges 70 has a pivot axis X9 extending in the left-right direction. The hinges 70 connect the cover 9 to the housing 89 such that the cover 9 is pivotable about the pivot axis X9.

The housing 89 includes accommodating portions 88. One of the accommodating portions 88 is formed at a left rear corner portion of the housing 89. Another accommodating portion 88 is formed at a right rear corner portion of the housing 89. Each accommodating portion 88 is a downward recess from an upper surface of the housing 89 and has a bottom. The recess has a substantially rectangular vertical section. The recess with the bottom extends through a rear portion of the upper cover 89A into the base 89B.

As depicted in FIGS. 4-7, the hinge 70 includes a base member 71, a pivot member 75 and a biasing member 77.

The base member 71 includes a generally prismatic column 71A and left and right support portions 71B. The column 71A is disposed at a lower portion of the base member 71. Each of the support portions 71B is disposed at an upper portion of the base member 71 and has a through hole. As depicted in FIG. 4, the column 71A is accommodated in the accommodating portion 88 to slidably move in the top-bottom direction. The column 71A is guided by inner wall surfaces of the accommodating portion 88 such that the base member 71 moves in the top-bottom direction relative to the housing 89.

As depicted in FIGS. 4-7, the pivot member 75 includes a supported portion 75B disposed at a rear portion thereof and a coupler portion 75A disposed at a front portion thereof. The coupler portion 75A has a generally plate shape having a width in the left-right direction. The width of the coupler portion 75A is greater than the width of the supported portion 75B. The supported portion 75B includes a pair of protrusions, each inserted into the through hole of a respective one of the support portions 71B. The pivot member 75 is configured to pivot about the pivot axis X9 relative to the base member 71. As depicted in FIG. 4, the coupler portion 75A is coupled to a bottom wall 9D of the cover 9 using a fastening device (e.g., screws 75F).

The hinge 70 including the base member 71 and the pivot member 75 moves the cover 9 between a closed position as depicted in FIGS. 1, 2 and 4, and an open position as depicted in FIG. 3.

At the closed position, the cover 9 is located above the support surface 81A. The cover 9 is configured to press a document on the support surface 81A toward the support surface 81A. If the document is a book that is relatively thick, the base members 71 of the hinges 70 move up in the respective accommodating portions 88 of the housing 89, depending on a thickness of the document. Consequently, the cover 9 at the closed position is allowed to properly press a relatively thick document toward the support surface 81A.

The cover 9 pivots to the open position about the pivot axis X9, as depicted in FIG. 3, such that the front end portion 9A moves upward and rearward. At the open position, the support surface 81A is exposed or revealed. As long as the cover 9 is pivoted such that the support surface 81A is at least partially exposed, it could be said that the cover 9 is located at the open position. At the open position, the cover 9 may form an angle of less than 90 degrees relative to the upper cover 89A or the support surface 81A.

Referring to FIG. 4, the biasing member 77 includes a cam surface (not depicted) formed at the pivot member 75 adjacent to the supported portion 75B, a compressed coil spring (not depicted) accommodated in the column 71A, a slide-contact portion (not depicted) pressed by the compressed coil spring against the cam surface of the pivot member 75. The biasing member 77 exerts a biasing force F1 between the base member 71 and the pivot member 75 so as to move the cover 9 upward.

Figure 8:
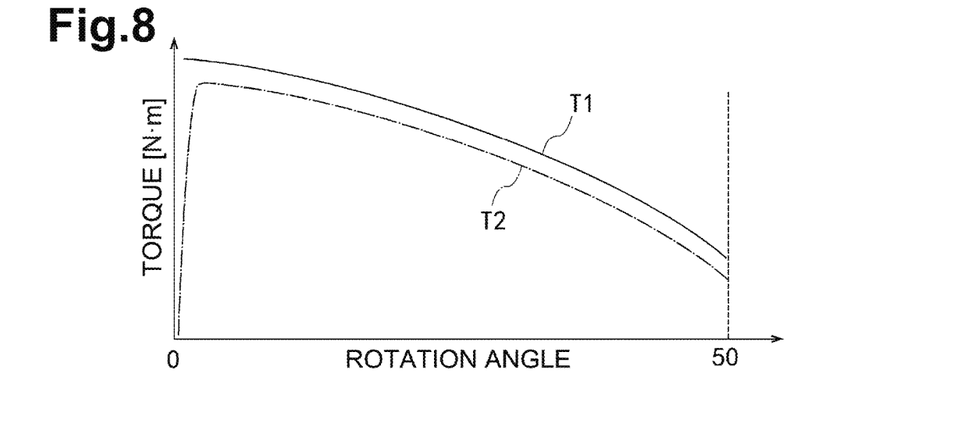
FIG. 8 is a graph showing torques T1 applied by the weight of the cover and torques T2 applied by a biasing member of the hinge, in relation to pivot angles of the cover.

As the cover 9 is moved from the closed position toward the open position, e.g., a pivot angle of the cover 9 relative to the support surface 81A increases from zero, a torque T1 and a torque T2 will change, as represented in FIG. 8, where the torque T1 is applied by the weight of the cover 9 to close the cover 9, and the torque T2 is applied by the biasing force F1 of the biasing member 77 to raise the cover 9. The torque T1 and the torque T2 gradually decrease with an increase in the pivot angles of the cover 9. The biasing force F1 of the biasing member 77 is set such that the torque T2 will not exceed the torque T1. Accordingly, the torque T2 is always less than the torque T1 with respect to the same pivot angle. The biasing member 77 is designed to exert the biasing force F1, which is less than a biasing force required to maintain the cover 9 at a pivoted position. The hinge 70, which includes the biasing member 77, does not have a free stop function that maintains the cover 9 at any pivoted position.

Figure 6:
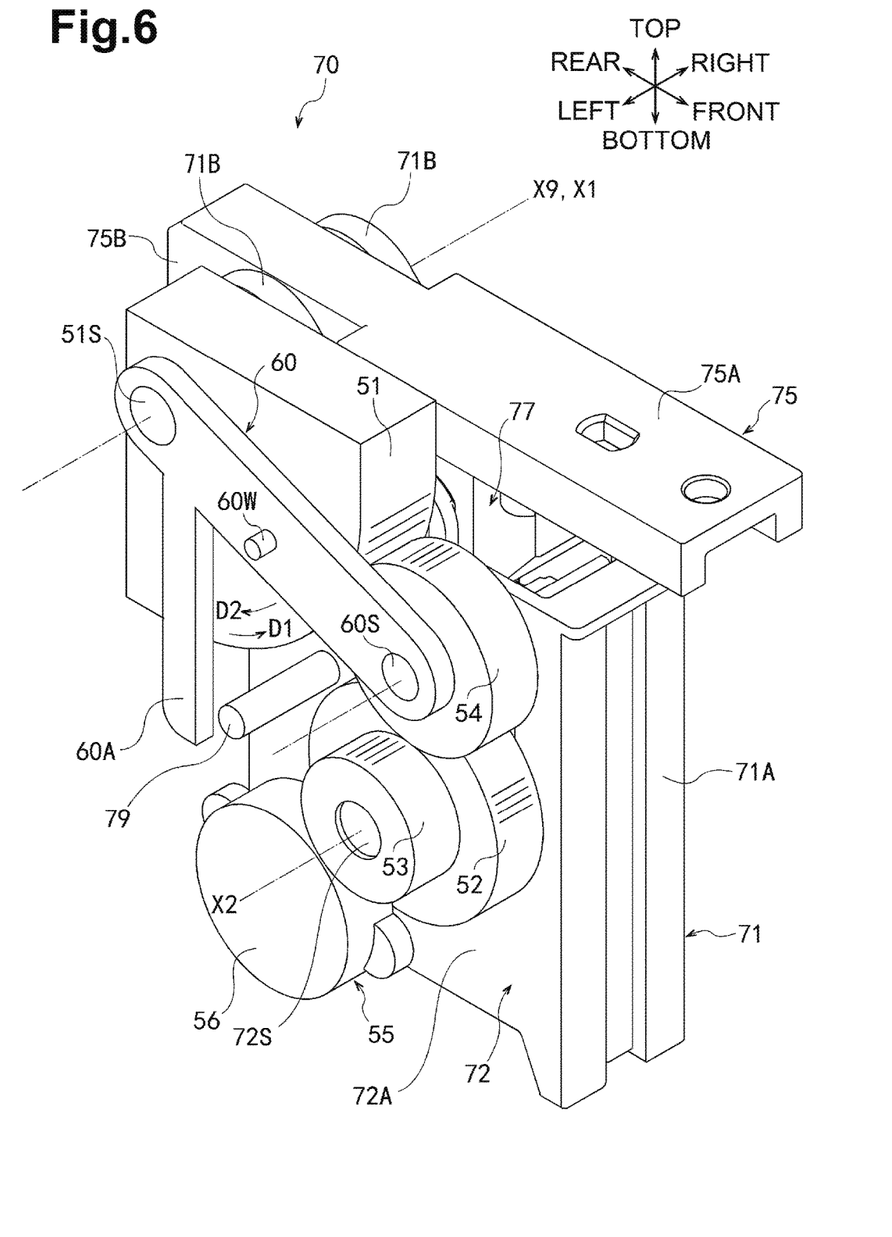
FIG. 6 is a perspective view of the hinge, a first gear, a second gear support, a second gear, an arm, a planet gear, and a decelerator of the image reading apparatus in the illustrative embodiment.
Figure 7:
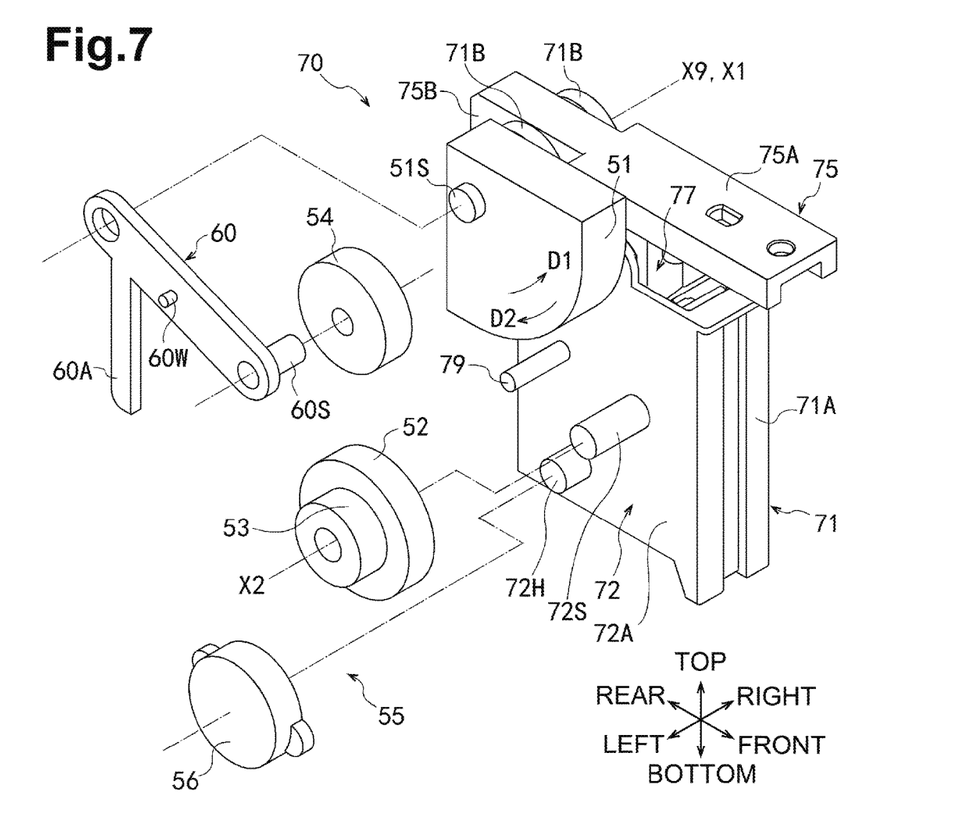
FIG. 7 is an exploded perspective view of the hinge, the first gear, the second gear support, the second gear, the arm, the planet gear, and the decelerator.
Figure 9:
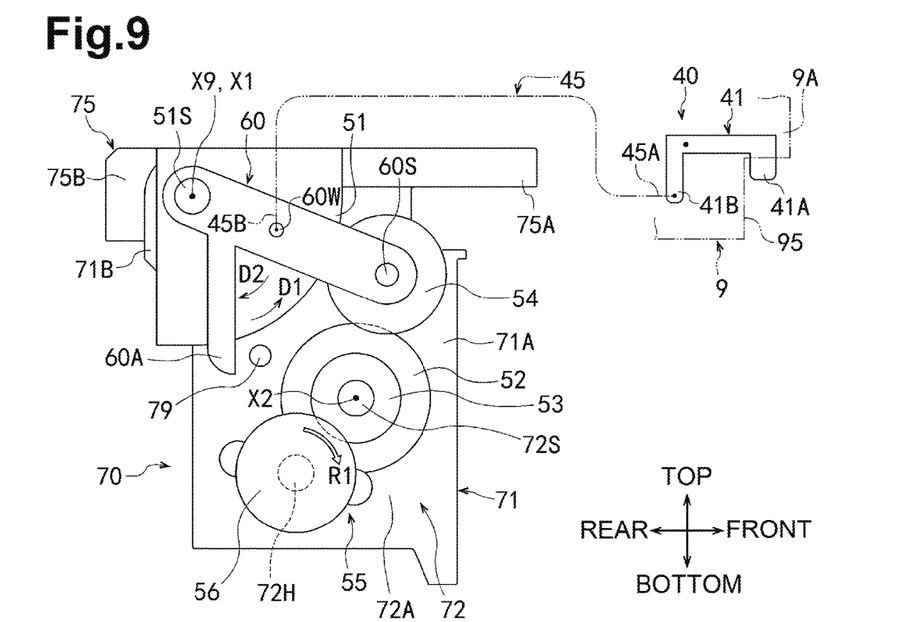
FIG. 9 is a side view of the hinge, the first gear, the second gear support, the second gear, the arm, the planet gear, the decelerator, and a selector of the image reading apparatus in the illustrative embodiment.

As depicted in FIGS. 6, 7 and 9, the hinge 70 includes a first gear 51, a second gear support 72, a stopper 79, a second gear 52, an arm 60, a planet gear 54, and a decelerator 55.

The first gear 51 is a fan-shaped gear integrally formed with the pivot member 75. The first gear 51 is located to the left of the left shaft support portion 71B. The first gear 51 has a first axis X1 coaxial with the pivot axis X9. The first gear 51 has a right side surface, a left side surface, and an arcuate surface. A portion of the right side surface of the first gear 51 is connected to a left side surface of the coupler portion 75A of the pivot member 75. The left side surface of the first gear 51 has a cylindrical arm support shaft 51S protruding leftward therefrom. The arm support shaft 51S has an axis coaxial with the first axis X1. The first gear 51 has gear teeth formed in the arcuate surface.

Figure 10:
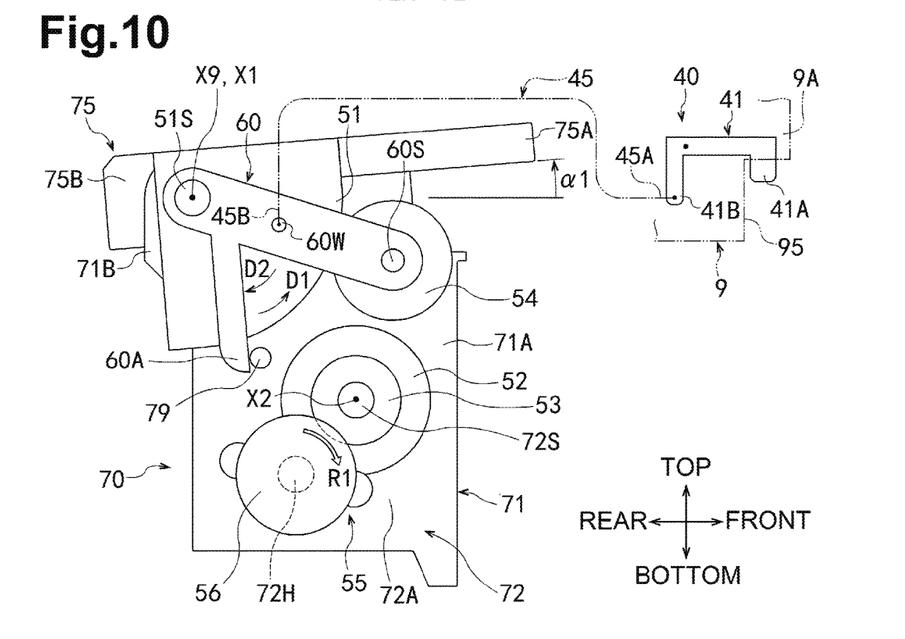
FIG. 10 is a side view of the hinge, the first gear, the second gear support, the second gear, the arm, the planet gear, the decelerator, and the selector.
Figure 11:
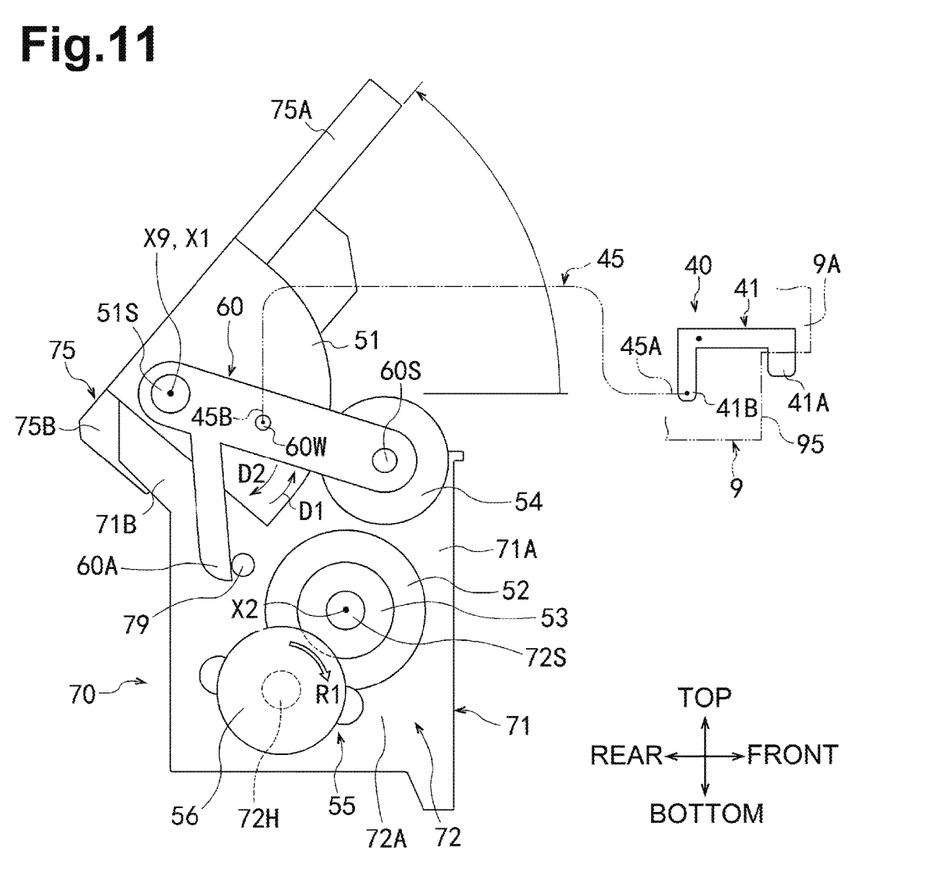
FIG. 11 is a side view of the hinge, the first gear, the second gear support, the second gear, the arm, the planet gear, the decelerator, and the selector.

As depicted in FIGS. 10 and 11, pivoting of the cover 9 from the closed position toward the open position may cause the pivot member 75 to pivot about the pivot axis X9 together with the cover 9. This may cause the first gear 51, which is integrally formed with the pivot member 75, to pivot about the pivot axis X9 in a first direction D1.

Figure 12:
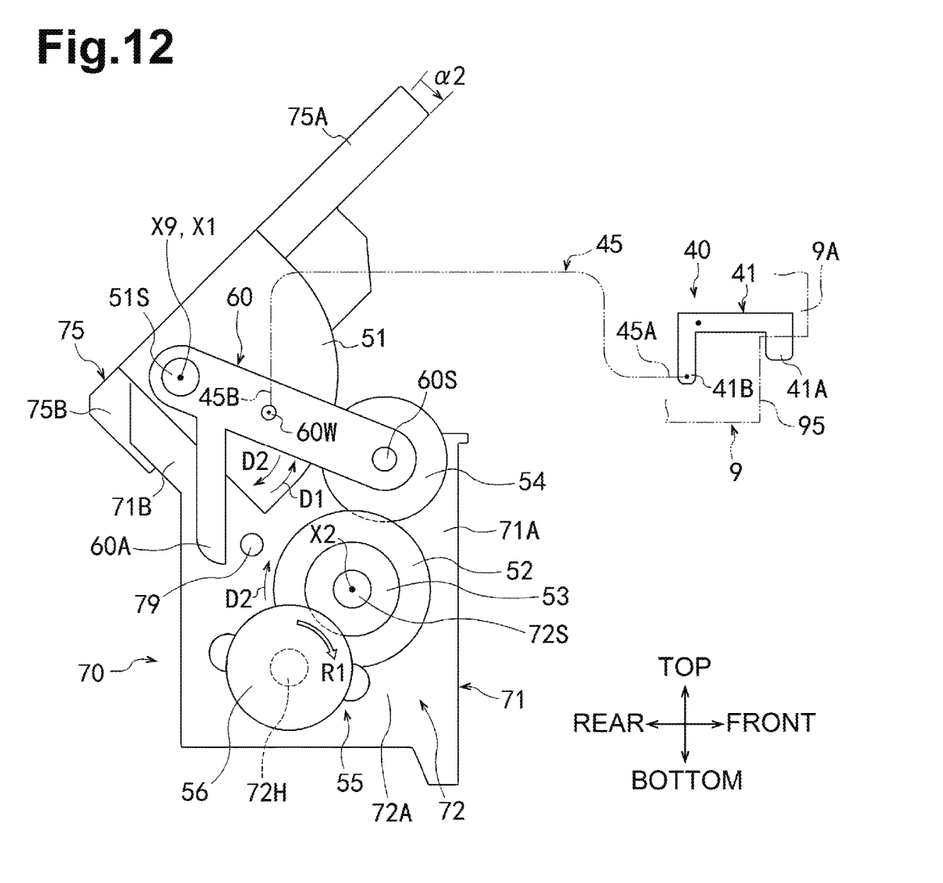
FIG. 12 is a side view of the hinge, the first gear, the second gear support, the second gear, the arm, the planet gear, the decelerator, and the selector.

As depicted in FIG. 12, pivoting of the cover 9 from the open position toward the closed position may cause the pivot member 75 to pivot about the pivot axis X9 together with the cover 9. This may cause the first gear 51, which is integrally formed with the pivot member 75, to pivot about the pivot axis X9 in a second direction D2 opposite to the first direction D1.

As depicted in FIGS. 6, 7 and 9, the second gear support 72 includes a left side surface 72A of the column 71A, a cylindrical second gear support shaft 72S protruding from the left side surface 72A, and a cylindrical rotary damper support shaft 72H. The second gear support 72 is integrally formed with the base member 71. The second gear support shaft 72S protrudes leftward from a generally central portion of the left side surface 72A. The second gear support shaft 72S has a second axis X2 parallel to the first axis X1. The rotary damper support shaft 72H protrudes leftward from a lower portion of the left side surface 72A.

The stopper 79 is disposed diagonally above and to the rear of the second gear support shaft 72S and the rotary damper support shaft 72H. The stopper 79 protrudes leftward from the left side surface 72A of the column 71A.

The second gear 52 is supported by the second gear support shaft 72S. The second gear 52 is configured to rotate about the second axis X2. The second gear 52 is disposed at least partially below the first gear 51 and at least partially to the front of the first gear 51.

The arm 60 is supported by the arm support shaft 51S. The arm 60 is configured to pivot about the first axis X1. The arm 60 includes a plate that extends frontward and downward.

The arm 60 includes a cylindrical planet gear support shaft 60S, a wire attachment portion 60W, and a contact portion 60A. The planet gear support shaft 60S is fixed to a first end portion of the arm 60 and protrude rightward from a right surface of the arm 60. The planet gear support shaft 60S extends parallel to the first axis X1. The wire attachment portion 60W protrudes leftward from a middle portion of a left surface of the arm 60. The contact portion 60A is a plate protruding downward from a portion of the arm 60 near the first axis X1 or near a second end portion of the arm 60 opposite to the first end portion. A lower end portion of the contact portion 60A is located behind the stopper 79, facing the stopper 79.

The planet gear 54 is rotatably supported by the planet gear support shaft 60S. The planet gear 54 always engages with the first gear 51. The planet gear 54 is configured to rotate about the planet gear support shaft 60S and to pivot about the first axis X1 around the first gear 51.

As depicted in FIG. 10, pivoting of the first gear 51 in the first direction D1 may cause the planet gear 54 to pivot about the first axis X1 in the first direction D1 around the first gear 51. The pivoting planet gear 54 may cause the contact portion 60A of the arm 60 to contact the stopper 79. The planet gear 54 stops pivoting at a disengaged position at which the planet gear 54 is disengaged and separated from the second gear 52. As the first gear 51 further pivots in the first direction D1 from a position as depicted in FIG. 10, the planet gear 54 may not pivot around the first gear 51, but may rotate. The planet gear 54 may thus stay at the disengaged position as depicted in FIG. 11. The planet gear 54 located at the disengaged position allows the first gear 51 to pivot or rotate in the first direction D1 based on the pivoting of the cover 9, but the rotation of the first gear 51 does not cause the second gear 52 to rotate.

As depicted in FIG. 12, the rotation of the first gear 51 in the second direction D2 may cause the planet gear 54 to pivot about the first axis X1 in the second direction D2 around the first gear 51 to an engaged position at which the planet gear 54 is engaged with the second gear 52. At the engaged position, the planet gear 54 is allowed to transmit the rotation of the first gear 51 to the second gear 52. Pivoting of the cover 9 from the open position toward the closed position causes the first gear 51 to pivot or rotate in the second direction D2. The rotation of the first gear 51 may be transmitted to the second gear 52 via the planet gear 54, thereby rotating the second gear 52 in the second direction D2.

The decelerator 55 is configured to reduce the speed of the second gear 52. As depicted in FIGS. 6, 7 and 9, the decelerator 55 includes a third gear 53 and a rotary damper 56. The third gear 53 is integrally formed with the second gear 52 and is disposed at a left side surface of the second gear 52. The third gear 53 has a diameter less than the second gear 52, and is configured to rotate about the second axis X2 together with the second gear 52. The rotary damper 56 is held or supported by the rotary damper support shaft 72H. The rotary damper 56 includes a rotor that engages the third gear 53 and a fluid (e.g., oil). The rotary damper 56 uses a damping resistance R1, which is substantially identical to fluid's viscosity resistance, to reduce the rotating speed of the second gear 52 that rotates together with the third gear 53.

The decelerator 55 may reduce the speed of the second gear 52 rotating in the second direction D2, via the third gear 53 applied with the damping resistance R1 of the rotary damper 56, as depicted in FIG. 12. The damping resistance R1 may be set such that the cover 9 stopping at the open position can pivot toward the closed position by its own weight. In one example, the damping resistance R1 may be applied to the third gear 53 to damp down the rotating speed of the second gear 52 nearly to zero, but not to zero.

The user may pivot the cover 9 from the closed position toward the open position, release his/her hand from the cover 9, and leave the cover 9 at the open position (e.g., at any pivot angle relative to the support surface 81A). Depending on the pivot angles of the cover 9, a certain torque T1 is applied to the cover 9 by its own weight and a certain torque T2 is applied to the cover 9 by the biasing forces F1 of the biasing members 77 of the hinges 70, as depicted in FIG. 8. Since the torque T1 is greater than the torque T2 (torque T1>torque T2), the cover 9 at the open position will move toward the closed position by its own weight. In a case where inequality "T1>T2" is satisfied, the cover 9 may move from the open position to the closed position within a few seconds, which will not be long enough for a user to place or remove a document on or from the support surface 81A. The illustrative embodiment uses the combination of the torque T2 applied by the biasing force F1 and the damping capability of the decelerator 55, thereby reducing a downward pivoting speed or a closing speed of the cover 9 toward the closed position.

As the cover 9, which is at the open position, pivots toward the closed position by its own weight, the pivotal movement of the cover 9 may be transmitted to the second gear 52, via the first gear 51 and the planet gear 54. The second gear 52 may thus rotate in the second direction D2. Since the damping resistance R1 is applied to the third gear 53, the rotating speed of the second gear 52 may be reduced nearly to zero. Accordingly, the cover 9 may pivot very slowly from the open position to the closed position. A period of time in which the cover 9 pivots from the open position to the closed position by its own weight may be within a range between a few minutes and a few hours. Therefore, the user may have enough time to place a document on the support surface 81A or remove the document from the support surface 81A without difficulties. The rotating speed of the second gear 52 may be adjusted as desired by selecting a rotary damper with a different size and/or with different damping performance from that of the rotary damper 56 of the decelerator 55 in the embodiment.

As depicted in FIGS. 3 and 9, the cover 9 includes a selector 40 including a lever 41 and a wire 45. The lever 41 includes a graspable portion 41A being graspable by a user, and a wire attachment portion 41B to which the wire 45 is attached. The wire attachment portion 41B faces the graspable portion 41A. The selector 40 is configured to move the planet gear 54 from the engaged position to the disengaged position when the cover 9 is left at the open position. The selector 40 is actuated by a user's operation of holding and moving up the graspable portion 41A in the handle recess 95. The lever 41 is an example of an "operative portion." The wire 45 is an example of an "actuator."

As depicted in FIGS. 3 and 9, the wire 45 connects the lever 41 to the arm 60. The wire 45 is movably located inside a tube (not depicted) in the cover 9. As depicted in FIG. 9, the wire 45 has a first end portion 45A and a second end portion 45B. The first end portion 45A is coupled to the wire attachment portion 41B of the lever 41. The second end portion 45B is coupled to the wire attachment portion 60W of the arm 60.

Figure 13:
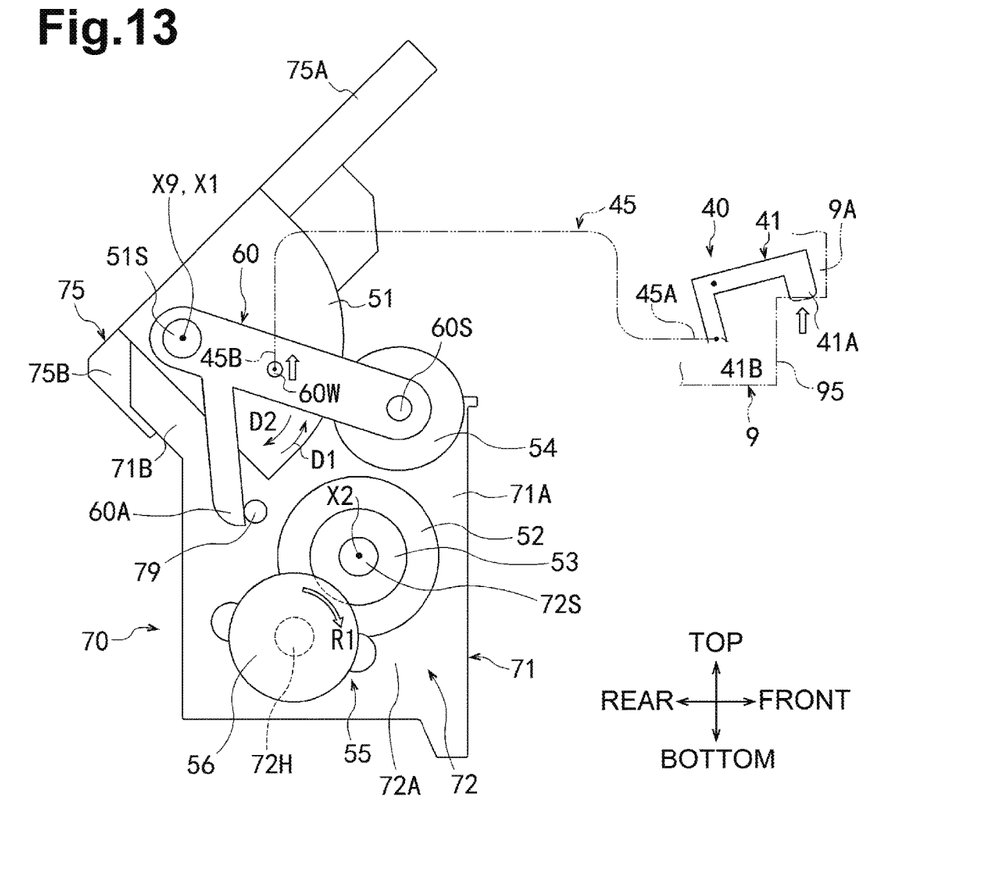
FIG. 13 is a side view of the hinge, the first gear, the second gear support, the second gear, the arm, the planet gear, the decelerator, and the selector.

The lever 41 is pivotally supported by the front end portion 9A of the cover 9. The lever 41 is configured to pivot between a non-actuating position as depicted in FIGS. 1, 3, and 9 to 12, and an actuating position as depicted in FIG. 13. At the non-actuating position as depicted in, for example, FIGS. 9 to 12, the graspable portion 41A of the lever 41 is located within the handle recess 95. The lever 41 is maintained at the non-actuating position by a biasing spring (not depicted). The lever 41 is moved to the actuating position, as depicted in FIG. 13, by a user's operation of moving up the graspable portion 41A. At the actuating position as depicted in FIG. 13, the graspable portion 41A of the lever 41 may be located outside the handle recess 95.

As depicted in FIG. 13, a user's operation of moving the lever 41 from the non-actuating position toward the actuating position may cause the wire attachment portion 41B of the lever 41 to pull the first end portion 45A of the wire 45 toward the front, thereby causing the second end portion 45B of the wire 45 to pull up the arm 60. As a result, the arm 60 may pivot in the first direction D1. This may cause the planet gear 54 to move to the disengaged position. Totally, the selector 40 causes the planet gear 54 to move from the engaged position to the disengaged position when the cover 9 is located at the open position.

In order to read an image of a document on the support surface 81A in the image reading apparatus 1, the scanning mechanism (not depicted) is actuated to move the reading sensor 3S in the left-right direction between a reading start position defined below a left edge of the support surface 81A and a reading end position defined below a right edge of the support surface 81A. In this way, the image sensor 3S reads the image of the document on the support surface 81A.

In order to read an image of a sheet conveyed from the feed tray 91 by the conveying unit 4 in the image reading apparatus 1, the scanning mechanism (not depicted) is actuated to move the reading sensor 3S to a stationary reading position defined below the reading surface 82A. When the conveying unit 4 conveys sheets SH from the feed tray 91 one by one along the conveying path P1, the reading sensor 3S reads an image of each of the sheets SH passing over the reading sensor 3S. Then, the conveying unit 4 discharges onto the discharge tray 92 each sheet having undergone image reading.

To place a document on the support surface 81A of the reading unit 8 or to remove a document placed on the support surface 81A, a user may pivot the cover 9 upward, by lifting up the front end portion 9A of the cover 9, from the closed position to the open position, as depicted in FIG. 3. As the user moves the cover 9, for example, by a slight amount α1, as depicted in FIG. 10, the first gear 51 pivots about the first axis X1 in the first direction D1, thereby moving the planet gear 54 to a disengaged position in which the planet gear 54 is disengaged from the second gear 52. The damping resistance R1 that the decelerator 55 exerts on the second gear 52 via the third gear 53, may not be applied to the planet gear 54 or the first gear 51. Accordingly, the user can open the cover 9 with a relatively small force, as depicted in FIG. 11.

The user gripping the cover 9 to pivot the cover 9 from the closed position toward the open position may release the grip. The cover 9 located at the open position may start to move from the open position to the closed position due to its own weight. As the cover 9 pivots downward, for example, by a slight amount α2, as depicted in FIG. 12, the first gear 51 pivots about the first axis X1 in the second direction D2, thereby moving the planet gear 54 to the engaged position in which the planet gear 54 engages the second gear 52. The damping resistance R1 exerted by the decelerator 55 is applied to the planet gear 54 and the first gear 51. The damping resistance R1 of the decelerator 55 is set to reduce a closing speed of the cover 9, which has been stopped at the open position, toward the closed position by its own weight. The setting of the damping resistance R1 may maintain the cover 9 at the open position for a while. While the cover 9 is maintained at the open position, the user is allowed to place a document on the support surface 81A of the reading unit 8 or remove a document from the support surface 81A. In this disclosure, an expression "the cover 9 maintained at the open position" includes the cover 9 stopped at a fully opened position, as well as that the cover 9 moving toward the closed position (e.g., reducing an angle relative to the support surface 81A) while allowing a user's access to the support surface 81A.

In order to close the cover 9, the user may hold the handle recess 95 while keeping the graspable portion 41A of the lever 41 up, thereby moving the lever 41, as depicted in FIG. 13, to the actuating position in which the wire 45 pulls the arm 60 such that the planet gear 54 may move from the engaged position to the disengaged position. The damping resistance R1 is not applied to the planet gear 54 located at the disengage position or the first gear 51. Accordingly, the user may readily close the cover 9 with a relatively small force.

If the user has left the cover 9 open, as depicted in FIG. 12, the damping resistance R1 is applied to the planet gear 54 and the first gear 51. With the damping resistance R1 and the weight of the cover 9, the cover 9 may move very slowly toward the closed position, reaching the closed position in the end. The cover 9 located at the open position will not be left open for a long period of time, which prevents or reduces the deformation of the cover 9. As described above, the conveying unit 4 is disposed at a left portion of the cover 9, and the center of gravity G1 of the cover 9 is located closer to the left end of the cover 9, as depicted in FIG. 2. This configuration may cause the cover 9 to deform twistingly if the cover 9 is left open. The illustrative embodiment, in which the cover 9 is not left open, may prevent or reduce such deformation of the cover 9.

The image reading apparatus 1 may prevent or reduce the deformation of the cover 9. Therefore, the cover 9 at the closed position covers the support surface 81A without leaving a gap between the cover 9 and the support surface 81A. This may prevent or reduce degradation of reading quality of documents. Further, since deformation of the cover 9 may be prevented or reduced, components located in the cover 9, such as a guide of the conveying unit 4, may not deform as well. In addition, components in the cover 9, such as feed rollers of the conveying unit 4, may maintain their positions (i.e., the positions of the components may not be shifted). Accordingly, the conveying unit 4 may properly convey documents.

In the image reading apparatus 1, the first axis X1, which is coaxial with the pivot axis X9, may provide a simple configuration for pivoting the first gear 51 in association with the pivoting of the cover 9.

In the image reading apparatus 1, the first gear 51 is integrally formed with the pivot member 75 and the second gear support 72 is integrally formed with the base member 71. This configuration may reduce the number of components used for the hinge 70 and facilitate assembling the hinge 70.

The image reading apparatus 1 may require a less force for a user to quickly move the cover 9 to the closed position, with a simple mechanism including the lever 41 and the wire 45.

The decelerator 55 of the image reading apparatus 1 has a simple configuration including the third gear 53 and the rotary damper 56. The rotary damper 56 is engaged with the third gear 53 whose diameter is less than that of the second gear 52. This may reduce a size of the rotary damper 56. The third gear 53 rotating at a speed less than the rotating speed of the second gear 52 may transmit the rotation of the second gear 52 to the rotary damper 56.

In the image reading apparatus 1, pivoting angles of the arm 60 that causes the planet gear 54 to pivot between the disengaged position and the engaged position, may be maintained within a certain range, by the contact portion 60A of the arm 60 contacting the stopper 79 when the planet gear 54 is at the disengaged position.

The illustrative embodiment described above is merely an example, and various changes, arrangements and modifications may be applied therein without departing from the spirit and scope of the disclosure.

In another embodiment, the first axis X1 may be parallel to the pivot axis X9 or may cross the pivot axis X9.

In another embodiment, the first gear 51 may be disposed at the cover 9. Alternatively, the first gear 51 may be disposed at the base member 71 of the hinge 70 or the reading unit 8, and a transmission mechanism configured to transmit pivotal movement of the cover 9 to the first gear 51 may be disposed between the cover 9 and the first gear 51.

The second gear support 72 may have an opening that receives a shaft provided at the second gear 52. The second gear support 72 may be disposed not at the base member 71 but at the reading unit 8. Similarly, the stopper 79 may be disposed not at the base member 71 but at the reading unit 8.

In another embodiment, the hinge 70 may not include the biasing member 77.

In another embodiment, one of the hinges 70 may include the first gear 51, the second gear support 72, the stopper 79, the second gear 52, the arm 60, the planet gear 54 and the decelerator 55, while the other one of the hinges 70 may be a conventional hinge that not include those components 51, 72, 79, 52, 60, 54, and 55 and that pivotally connects the cover 9 to the reading unit 8.

The rotary damper may be of a type that uses a viscosity resistance or frictional resistance.

What is claimed is:

1. An image reading apparatus comprising:
    a reading unit including a support surface and a reading sensor;
    a hinge having a pivot axis, the hinge being connected to the reading unit; and
    a cover connected to the hinge, the cover configured to pivot about the pivot axis between a closed position in which the cover covers the support surface, and an open position in which the cover reveals the support surface;
    wherein the hinge comprises:
        a base member supported by the reading unit;
        a pivot member supported by the base member pivotally about the pivot axis, the pivot member coupled to the cover;
        a first gear configured to pivot about a first axis in a first direction based on pivoting of the cover from the closed position toward the open position and configured to pivot about the first axis in a second direction opposite to the first direction based on pivoting of the cover from the open position toward the closed position;
        a second gear;
        a support portion that supports the second gear to allow the second gear to pivot about a second axis parallel to the first axis;
        an arm configured to pivot about the first axis;
        a planet gear rotatably supported by the arm and engaged with the first gear, wherein the planet gear is configured to pivot in the first direction to a disengaged position in which the planet gear is disengaged from the second gear and to pivot in the second direction to an engaged position in which the planet gear is engaged with the second gear; and
        a decelerator configured to apply a damping resistance to the second gear, as the planet gear engages with the second gear during movement of the cover from the open position to the closed position.

2. The image reading apparatus according to claim 1, wherein the pivot axis is the first axis.

3. The image reading apparatus according to claim 2, wherein the first gear is integral with the pivot member.

4. The image reading apparatus according to claim 1, wherein the support portion is integral with the base member.

5. The image reading apparatus according to claim 1, further comprising a selector configured to move the planet gear from the engaged position to the disengaged position.

6. The image reading apparatus according to claim 5, wherein the selector comprises:
    an operative portion supported by the cover and configured to move between a non-actuating position and an actuating position; and
    an actuator disposed between the operative portion and the arm, the actuator configured to, when actuated by movement of the operative portion to the actuating position, cause the arm to pivot to a particular position in which the planet gear supported by the arm is located at the disengaged position.

7. The image reading apparatus according to claim 6, wherein the operative portion is a lever disposed at a portion of the cover opposite to and spaced from the pivot axis of the cover, and
    wherein the actuator is a wire connected to the lever and the arm.

8. The image reading apparatus according to claim 1, wherein the decelerator includes a rotary damper.

9. The image reading apparatus according to claim 8, wherein
    the decelerator further comprises a third gear integral with the second gear and configured to rotate about the second axis, and
    the third gear has a diameter less than the second gear and engages with the rotary damper.

10. The image reading apparatus according to claim 1, further comprising a stopper configured to contact the arm and hold the planet gear at the disengaged position.

11. The image reading apparatus according to claim 1, wherein the arm includes a plate.

12. An image reading apparatus comprising:
    a reading unit including a support surface and a reading sensor;
    a hinge having a pivot axis, the hinge being connected to the reading unit; and
    a cover connected to the hinge, the cover configured to pivot about the pivot axis between a closed position in which the cover covers the support surface, and an open position in which the cover reveals the support surface;
    wherein the hinge comprises:
        a base member supported by the reading unit;
        a pivot member supported by the base member pivotally about the pivot axis, the pivot member coupled to the cover;
        a first gear configured to pivot about a first axis in a first direction based on pivoting of the cover from the closed position toward the open position and configured to pivot about the first axis in a second direction opposite to the first direction based on pivoting of the cover from the open position toward the closed position;
        a second gear;
        a support portion that supports the second gear to allow the second gear to pivot about a second axis parallel to the first axis;
        an arm configured to pivot about the first axis;
        a planet gear rotatably supported by the arm and engaged with the first gear, the planet gear being engagable with the second gear; and
        a decelerator configured to apply a damping resistance to the second gear, as the planet gear engages with the second gear during movement of the cover from the open position to the closed position.

13. The image reading apparatus according to claim 12, wherein the planet gear is configured to pivot in the first direction to a disengaged position in which the planet gear is disengaged from the second gear and to pivot in the second direction to an engaged position in which the planet gear is engaged with the second gear, and wherein the image reading apparatus further comprises a selector configured to move the planet gear from the engaged position to the disengaged position.

14. The image reading apparatus according to claim 13,
wherein the second gear is disposed between the decelerator and the base member, and
wherein the decelerator further comprises a rotary damper and a third gear, the third gear being integral with the second gear and configured to rotate about the second axis, and
the third gear has a diameter less than the second gear and engages with the rotary damper.

* * * * *